J. Nelson.
Harvester Rake.
No. 21,437  Patented Sep. 7, 1858
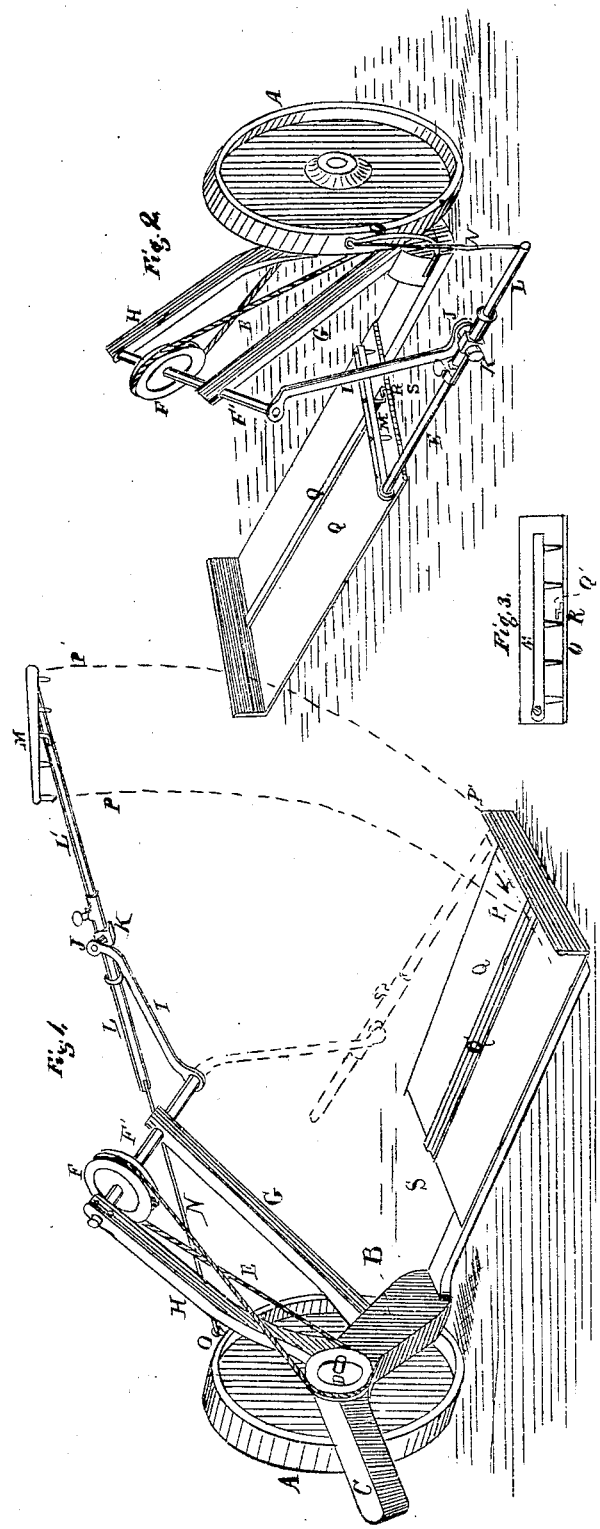

UNITED STATES PATENT OFFICE.

JOHN NELSON, OF ROCKFORD, ILLINOIS.

IMPROVEMENT IN RAKING ATTACHMENTS TO HARVESTERS.

Specification forming part of Letters Patent No. 21,437, dated September 7, 1858.

*To all whom it may concern:*

Be it known that I, JOHN NELSON, of Rockford, in the county of Winnebago and State of Illinois, have invented a new and useful Improvement in Automaton Rakers for Harvesters; and I do hereby declare that the following is a full and complete description of the construction and operation of the same, reference being had to the accompanying drawings, in which—

Figure 1 is a perspective front view of my improved automaton rake; Fig. 2, a perspective rear view, and Fig. 3 a view of a detached section.

Like letters refer to like parts in the different views.

A represents the driving-wheel of the raker; B, the drag-bar, and C the neap.

There is a pulley, D, upon the inner end of the shaft of the driving-wheel, which carries the band E to the pulley F, whose shaft F' is supported by standards G H. These standards are inserted into the drag-bar, as seen in Fig. 1, and receive at their top end, in boxes fitted to receive them, the journals of the shaft F'. An arm or crank, I, is attached to the back end of the shaft F', and stands obliquely to the line of the shaft. This arm I is of sufficient length to reach within a foot or eighteen inches of the ground. The outer end of the arm I is furnished with a wrist, which fits into a double socket, K. Into each end of this socket is inserted and secured, by a thumb-screw or otherwise, a round rod, L L', which together form the handle of the rake.

The rake-head M is rigidly attached to the handle of the rake at a slightly obtuse angle. The short end L of the rake-handle has a strong cord, N, fastened to it, the opposite end of said cord being attached to a spring, O, to allow the cord to be drawn tant without breaking, the spring yielding a little to allow the arm I to pass the dead-center. The rake-head M is thus thrown obliquely backward, entirely clear of the standing or falling grain. The direction of the rake-head is indicated by by the dotted lines in Fig. 1, (seen at P P'.) When the rake-teeth strike the platform Q they do so with an oblique forward motion in the direction of the arrow in Fig. 1.

In order to prevent the rake-head from rising and to keep it from moving forward toward the cutter-bar, I attach to the whole length of the platform a rib or guide, Q', having an elevated edge, looking backward. The middle tooth of the rake-head is hooked, and this, falling upon the platform back of the rib or guide Q', passes under the raised edge of the guide, as seen at R, Fig. 3, and is thereby guided in its passage over the platform Q, and at the same time prevented from rising. While the rake is passing over from the rear to the front end of the platform, after having raked off the grain or grass upon it, the platform is again filled, and the rake, as it descends and moves backward, again clears the platform Q and deposits the contents in a bunch or gavel upon the ground at S, and so on, the platform being cleared as fast as filled, and the grain or grass deposited in gavels.

This automaton rake and its appendages can be attached to any harvester in the manner herein described, or in any other manner that may be found convenient, and worked by means of a pulley upon the shaft of the driving-wheel or otherwise.

What I claim as my improvement, and desire to secure by Letters Patent, is—

The arrangement of the arm I and rake connected by an articulating joint at J, the spring O, and cord N, in combination with the guide Q', operating conjointly in the manner and for the purpose set forth.

JOHN NELSON.

Witnesses:
BELA SHAW,
THOS. A. CHANDLER.